Nov. 14, 1961 A. CAHNE 3,008,601
POLYTETRAFLUOROETHYLENE COATED COOKING UTENSILS
Filed Dec. 8, 1955
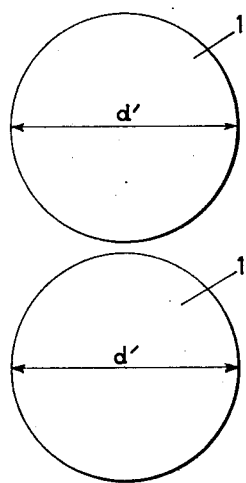
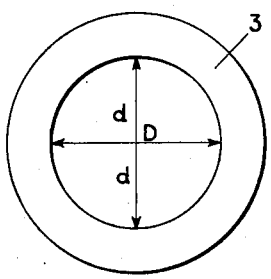
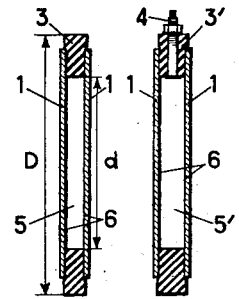
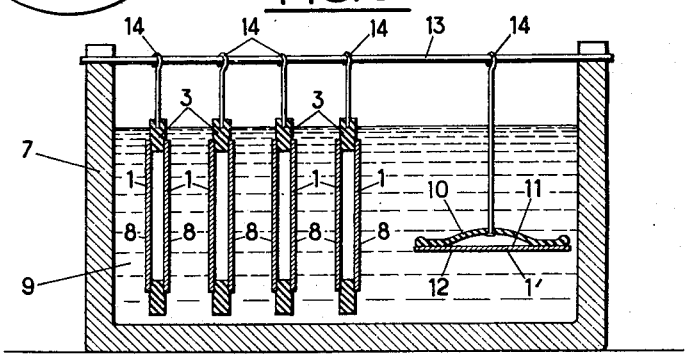
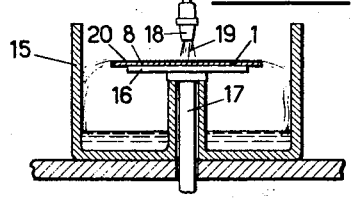
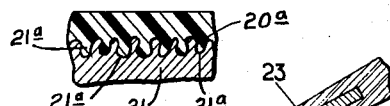
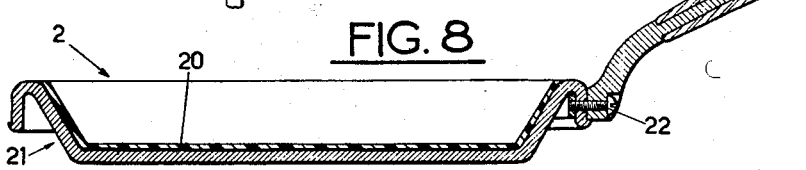
INVENTOR
Armand Cahne
By Holcombe, Wetherill & Brisebois
ATTORNEYS

3,008,601
POLYTETRAFLUOROETHYLENE COATED COOKING UTENSILS

Armand Cahne, Gif-sur-Yvette, France, assignor, by direct and mesne assignments, to Collette Gregoire, Paris, France
Filed Dec. 8, 1955, Ser. No. 551,784
Claims priority, application France Dec. 13, 1954
4 Claims. (Cl. 220—64)

The present invention has for its object a method for producing articles covered with polytetrafluoroethylene, a product known in the trade under the trade name "Teflon." The invention also relates to articles produced by carrying said method into practice.

More specifically, one object of the invention is to provide a process for manufacturing containers, and more particularly aluminum containers coated with Teflon for cooking food.

Containers have already been proposed for cooking food, particularly in frying pans or the like, in order to reduce to a small quantity the mass of fatty substances necessarily used for preventing the food from sticking to the inside wall of the container. Such containers are generally provided with projecting or depressed portions, such as serrations, ribs or grooves, suitable for limiting the food portions which are in contact with the heating surface and/or for providing small receptacles for the fatty substance.

However, such containers have but a limited use; they gradually lose their quality in use, either because the container gets out of shape or has irregularities on its surface, or on account of the fact that previous cooking operations have left residues, since it is rather difficult to perfectly clean them.

Therefore, in the case of containers for cooking food, one object of the invention is to palliate the aforesaid drawbacks by providing a container which may be utilized for cooking food with extreme ease, without, however, utilizing any additional fatty substance: oil, butter, fat, lard or the like necessarily used until now for preventing the food from sticking.

In a preferred form of the invention, such result is achieved by a container which is characterized by the fact that it is internally coated with Teflon.

Until now, to the best knowledge of the inventor, no Teflon covered container had been proposed for cooking food.

However, articles embodying the principle of the invention have, however, proven that truly surprising results are achieved when a Teflon film is applied inside of containers for cooking food. As a matter of fact, by utilizing a stew-, frying- or other pan, or similar article, or a cooking support, such as a griller, coated with Teflon, it is possible without adding any fatty substance to cook any food; meat, eggs, sausages, etc., all food which until now is cooked by interposing a fatty substance between the food and the container, and, besides, the resulting dish is equally if not more tasty than when cooked in the conventional manner. Moreover, when performed in a container or on a support according to the invention, the cooking does not emit any smell and is perfectly uniform, that is to say that more or less browned areas assuming various colors and consistencies depending on surface irregularities of the container or an unequal distribution of the fatty substance do not any more appear on the food face facing the adjacent surface of the container. Furthermore, in the case of an article made of aluminum, any formation of aluminum chloride or other aluminum salt is avoided.

There are reasons to believe that the Teflon of which a kitchen container according to the invention is composed acts not only by its absolute chemical inertia and its non-adhesiveness but also because of its fatty substance nature (as a matter of fact, the Teflon molecule is close to the paraffin molecule). In a container according to the invention, cooking is performed in some manner by interposing, between the food and the metal of which said container is composed a fatty substance, namely Teflon, which remains in every way unaltered at the cooking temperature and entirely secured on its supporting base, namely the body of said container; that fatty substance does not emit any smell and can be utilized for a plurality of successive cooking operations without replacement.

The container, support or other article according to the invention, may be utilized not only for cooking operations requiring a high temperature at the contact area between the article and the food, as, for instance, for frying or grilling, but also in the other cases where it is chiefly the quality of non-adhesiveness which intervenes, as, for instance, for boiling milk, preparing products made of Italian paste, and warming up food.

In all cases, the container remains constantly clean and no particle of any food which has been cooked or warmed up by utilizing said container, including Italian paste or melted cheese, sticks thereto. Particularly, in a pan according to the invention, milk has been kept boiling until all liquid has disappeared and yet the residue immediately comes loose instead of sticking to the pan, as is the case with a pan of any known type, which can be relieved of said residue only at the cost of a very careful cleaning. The same is true when caramelizing sugar. Therefore, for perfectly cleaning the improved container after use, it is sufficient to merely wipe it inside with a cloth or a wad of paper.

The invention is principally applicable to cooking containers or articles such as stew-pans, frying pans etc.; it is also applicable to other kitchen utensils such as strainers, spoons, forks, vegetable pressers; in such cases, advantage is principally taken from the non-adhesiveness of Teflon.

The invention is also applicable to articles not included in the household equipment, and particularly to apparatus made of Teflon coated metal to be used in the industry, and particularly the chemical industry, when the non-adhesiveness of Teflon and its neutrality in regard to practically all chemicals are useful characteristics. The Teflon coating may be deposited either when the article has already been given its shape, i.e. next to the flanging or embossing phase, or on the blank from which the article is to be made. However, in order to be commercially suitable for many purposes the polytetrafluoroethylene coating must be able to withstand the scoring and boiling test. This test is performed by cutting into the surface of a test piece of polytetrafluoroethylene coated metal by means of a sharply pointed tool, two sets of parallel grooves, the two sets being mutually perpendicular and consisting of grooves which are spaced about one millimeter apart. The layer of polytetrafluoroethylene is cut by the pointed tool until the metal shows at the bottom of the groove. The test piece which has been scored in this manner is kept in boiling water for six hours. A second network of grooves similar to the first is cut into the test piece when it leaves the boiling water, with its grooves running in a different direction from those of the first group. The grooves of the second network are also cut into the test piece until the metal shows at the bottom thereof. No portion of the polytetrafluoroethylene coating should come loose from the base while the second network of grooves is being cut.

In order that the Teflon or coating strongly adheres to the container or other article and cannot be stripped off neither with the nail nor by a hard-edged tool, that said coating does not crack, and withstands the scoring and boiling test, particularly when the base is made of aluminum, it must necessarily be subjected to a preparatory treatment before a Teflon film may usefully be deposited on said surface.

According to a feature of the invention, such preparatory treatment comprises attacking the surface (e.g., made of metal or enamel coated) with an acidic solution, which, preferably, is a solution of hydrochloric acid in the case of aluminum containers.

When Teflon is being applied on an article which has been already formed into the desired shape, the article surface is attacked with an acidic solution of the type described in the copending patent application simultaneously filed by the applicant, the Teflon film being then applied as described in said application.

When developing the invention, I have found that, as far as the fabrication costs and the good behaviour of the Teflon film produced are concerned, it is often more advantageous to apply the Teflon layer on the blank from which the article is made, the flanging or embossing operations being performed on said blank already coated with Teflon.

In conformity with that preferred embodiment of the invention, the fabrication procedures take place in the following order:

(a) At least one face of the blank to be treated is attacked with an acidic solution so that said face be ready for receiving a layer of Teflon, as indicated in the aforesaid patent application;

(b) The attacked face of the blank is coated with Teflon;

(c) The Teflon layer is dried and fused;

(d) The flanging or embossing operations are performed on the blank to form the container or other article into shape.

By means of the improved method according to the invention, containers may be provided, a surface of which is coated with Teflon having any desired shape, a result which cannot practically be achieved when it is desired to apply the Teflon layer on a finished container when the latter presents particularly deep folds or recesses.

When, in said preferred embodiment, it is desired to attack only one face of the blank, the procedure is the following:

(1) Two blanks are so relatively disposed that their backs are facing each other and are separated by a spacing ring made of a material which is flexible and unattacked by the acid utilized for said preparatory attack, for instance, of rubber, and, by exerting a pressure on or through a valve, the air enclosed within the space delimited by said blanks and ring is discharged, in order to create a vacuum within said space;

(2) The outer surface of each blank is attacked by at least one acid, as, for instance, by dipping the blanks and ring as a whole unit into an acid bath;

(3) For coating the blank with Teflon, said blank is placed in centered position on a platen which is rotatable about a vertical axis, with the attacked face to be coated with a layer of Teflon turned upwards; the dispersion of Teflon is poured or sprayed on the upper surface of the blank while the latter is rotating, the Teflon in excess being, preferably, recuperated in a tank which surrounds the coating device;

(4) The Teflon layer is then dried and fused in an oven at a temperature of about 370° C. (700° F.) for 10 minutes;

(5) Finally, the flanging or embossing operations are performed on the article.

Besides, by treating the blanks before forming them into shape, it is possible to fuse or bake under pressure by means of a press provided with a heating plate maintained at a temperature of about 370° C. (700° F.), a result which cannot practically be achieved when the Teflon layer has been deposited and, consequently, fused on a complicated shape article and not on a flat blank.

In order to illustrate the possibilities of carrying the invention into practice, and without intending to thereby limit its scope, some embodiments of same, given by way of examples, are hereinafter described with reference to the appended diagrammatical drawings in which:

FIG. 1 shows two blanks made of aluminum.

FIG. 2 is a washer or ring made of rubber to be utilized when treating the blanks shown in FIG. 1.

FIGS. 3 and 4 show two forms of a device for producing a partial vacuum within the space limited by both blanks and the ring.

FIG. 5 is a cross-sectional view of a tank for performing an acid attack on a series of blanks.

FIG. 6 is a cross-sectional view of a coating device, illustrating a manner of depositing Teflon on a blank which has been previously subjected to an acid attack.

FIG. 7 is a fragmentary cross-sectional view through a frying pan constructed in accordance with the present invention having parts broken away, taken at a magnified scale.

FIG. 8 is a cross-sectional view, drawn at a larger scale, of a frying-pan produced according to the invention.

To begin with, two circular blanks 1, 1 are prepared, the diameter $d'$, of which has been so predetermined that the forming operations will produce the frying-pan 2 shown in FIG. 8.

A spacing ring such as 3 (FIG. 2) made of rubber may be utilized for each pair of blanks 1, 1 in a mounting arrangement, such as shown in FIG. 3, the ring 3 being so dimensioned that its inner diameter $d$ is somewhat smaller than the diameter $d'$ of each blank, while the outer diameter $D$ of said ring 3 is larger than said diameter $d'$. Instead of a plain spacing ring such as 3, as shown in FIG. 3, a spacing ring such as 3' may be utilized, which is provided with a valve such as 4, as shown in FIG. 4. In the case of FIG. 3, the desired vacuum within the space 5 limited by the ring 3 and the blanks 1, 1 is produced by pressure. In the case of FIG. 4, the desired vacuum within the space 5' limited by the ring 3' and the blanks 1, 1, is produced by suction through a valve 4, by means of a pump (not shown).

By mounting the pairs of blanks as shown in FIG. 3 or FIG. 4, the inner faces 6 of both blanks 1, 1 are isolated from outside, in such manner that, when said blanks are placed within a tank such as 7 (FIG. 5), only the outer faces 8 of said blanks are attacked by the acidic solution 9 contained within the tank 7.

When the blanks are made of cold-hardened aluminum of about 99.5% purity, a bath having the following composition may be utilized:

|  | Volumes |
|---|---|
| Commercial hydrochloric acid | 20 |
| Water | 79 |
| Hydrogen fluoride | 1 | the attack being performed at 20° C. (68° F.) for 10–15 minutes. The acidic solutions described in the aforesaid U.S. copending application Serial No. 551,875, filed December 8, 1955, now Patent 2,944,927, may be also utilized.

FIG. 5 shows a series of pairs of blanks 1, 1, wherein each pair 1, 1 cooperates with a ring 3, as above described.

On the right hand portion of said FIG. 5 is also shown another mounting including a plain suction-grip device 10 for isolating the upper surface 11 of the blank 1', while the lower surface 12 of said blank remains exposed and is the only surface to be attacked by the acidic solution 9.

The blanks may be supported from a rod 13 by means of hooks 14; obviously, any other attaching means may be utilized. The blanks may also be allowed to lay on the bottom of the tank 7.

The attacked surface of the blank may be coated with Teflon by utilizing, for instance, the coating device shown in FIG. 6, which comprises a tank 15 inside of which rotates a horizontal platen 16 fixedly secured or integral with a vertically mounted rotary axle 17. A nozzle 18 blows a jet of Teflon 19 on the central portion of the blank 1 which has been so placed on the platen 16 that the upper exposed face 8 of said blank is the same exposed face 8 which had been subjected to the acid attack in the tank 7.

Under the action of centrifugal forces, the Teflon delivered at 19 by the nozzle 18 is distributed over the whole face 8 of the blank 1, while the Teflon in excess is recovered in the tank 15 which surrounds the platen 16.

The axle 17 which carries the platen 16 may, for instance, be driven so as to rotate at a speed of about 200–500 r.p.m. The layer of Teflon thereby produced is then allowed to dry on the blank 1. Several Teflon coatings may be deposited one after the other by utilizing the same coating device of FIG. 6. It is possible, for instance, to deposit two or three layers of dispersion of Teflon, according to its concentration, while drying each layer before depositing the next. However, there is no advantage to increase the thickness of the Teflon layer over 2.5 hundredths of a millimeter.

As a coating solution, a solution may be utilized which comprises one volume of water and one volume of a solution which contains granules of Teflon, the diameter of which is approximately equal to .5 micron, dispersed in water to which a wetting agent has been added.

The fusing operation of the film 20 of Teflon is performed within an oven at a temperature comprised between 370° C. (700° F.) and 400° C. (750° F.) for about 10 minutes to produce a coating of pure Teflon.

The baking is advantageously performed under pressure by means of a press comprising a heating plate on the face which comes in contact with the film of Teflon. Said heating plate is maintained at a temperature comprised between 370° C. (700° F.) and 400° C. (750° F.).

As a matter of fact, while the invention was being developed it has been found that, when baking under pressure a more compact film of Teflon is produced which is far more durable when in use.

The forming or embossing operations are then performed on the blank 1 coated with the film of Teflon 20 so that the whole be given the shape of the frying-pan 21 shown in FIG. 8.

In order to avoid that the securing means, comprising, for instance, screws 22 of a handle 23 of the frying-pan 21, extend through the Teflon layer 20 which will be in contact with the food to be cooked, an arrangement such as shown in FIG. 8 will be satisfactory.

As best seen in FIGS. 7 and 8, the acid etch forms cavities or pits 21ᵃ in the pan 21 which define cavities of irregular wall contour and which receive extensions 20ᵃ of the polytetrafluoroethylene layer 20, which extensions mate intimately with cavities 21ᵃ to hold the layer 20 to the frying pan 21.

While only the main objects of the invention have been described and only a few examples for carrying the said invention into practice have been given in the above specification, it will be understood, of course, that the present invention is not limited thereto, since many modifications may be made and the appended claims intend to cover such modifications within the true spirit and scope of the invention.

I claim:

1. A cooking utensil comprising a metallic base of substantially uniform cross section, having a plurality of cavities of irregular wall contours, and a coating of fused pure polytetrafluoroethylene covering substantially only the inner surface of said base and filling said cavities, and interlocking the coating to the metal, said metallic base having a substantially flat outer bottom surface.

2. A cooking utensil as claimed in claim 1, wherein said metallic base is aluminum.

3. A metallic cooking utensil of the following substantially flat uniform cross sectional construction having inner and outer working surfaces; pure polytetrafluoroethylene forming a continuous film on its inner working surface, the side of said film adjacent the inner working surfaces of said utensil characterized by minute extensions becoming generally larger as they extend from the film, said extensions mating intimately with complemental cavities in the inner working surfaces of said metallic cooking utensil, said utensil being shaped to retain the contents of said cooking utensil upon the outer working surface of the polytetrafluoroethylene film, said metallic base having a substantially flat outer bottom surface.

4. A cooking utensil as claimed in claim 3 wherein said metallic base is aluminum.

References Cited in the file of this patent

UNITED STATES PATENTS

| | | |
|---|---|---|
| 492,588 | Rudolph | Feb. 28, 1893 |
| 2,133,346 | Diller | Oct. 18, 1938 |
| 2,303,774 | Van der Willigen | Dec. 1, 1942 |
| 2,378,445 | Soday | June 19, 1945 |
| 2,462,242 | Webb et al. | Feb. 22, 1949 |
| 2,510,078 | Compton et al. | June 6, 1950 |
| 2,542,069 | Young | Feb. 20, 1951 |
| 2,562,117 | Osdal | July 24, 1951 |
| 2,567,162 | Sanders | Sept. 4, 1951 |
| 2,580,131 | Rowell | Dec. 25, 1951 |
| 2,604,751 | Haley | July 29, 1952 |
| 2,606,510 | Collins | Aug. 12, 1952 |
| 2,686,767 | Green | Aug. 17, 1954 |
| 2,691,814 | Tait | Oct. 19, 1954 |
| 2,731,360 | Love | Jan. 17, 1956 |
| 2,776,918 | Bersworth | Jan. 8, 1957 |
| 2,777,783 | Welch | Jan. 15, 1957 |
| 2,820,312 | Coontz | Jan. 21, 1958 |
| 2,850,999 | Kaplan | Sept. 9, 1958 |
| 2,944,917 | Cahne | July 12, 1960 |

FOREIGN PATENTS

| | | |
|---|---|---|
| 657,085 | Great Britain | Sept. 12, 1951 |

OTHER REFERENCES

Scientific American Cyclopeida of Formulas (Hopkins), 1925, published by Mann and Co., New York, page 949.

UNITED STATES PATENT OFFICE
CERTIFICATE OF CORRECTION

Patent No. 3,008,601                                                 November 14, 1961

Armand Cahne

It is hereby certified that error appears in the above numbered patent requiring correction and that the said Letters Patent should read as corrected below.

In the grant, lines 2, 3 and 12, and in the heading to the printed specification, line 5, name of assignee, for "Collette Gregoire", each occurrence, read -- Colette Gregoire --.

Signed and sealed this 17th day of April 1962.

(SEAL)
Attest:

ESTON G. JOHNSON                                    DAVID L. LADD

Attesting Officer                                            Commissioner of Patents